(12) United States Patent
Chang

(10) Patent No.: US 8,820,868 B2
(45) Date of Patent: Sep. 2, 2014

(54) INKJET PRINTER'S INK PROTECTION METHOD

(75) Inventor: Yuan Chang, Newtown Square, PA (US)

(73) Assignee: Yuan Chang, Irvine, CA (US)

( * ) Notice: Subject to any disclaimer, the term of this patent is extended or adjusted under 35 U.S.C. 154(b) by 0 days.

(21) Appl. No.: 13/880,368

(22) PCT Filed: Feb. 17, 2012

(86) PCT No.: PCT/CN2012/071251
§ 371 (c)(1),
(2), (4) Date: Sep. 1, 2013

(87) PCT Pub. No.: WO2012/110001
PCT Pub. Date: Aug. 23, 2012

(65) Prior Publication Data
US 2013/0335465 A1    Dec. 19, 2013

(30) Foreign Application Priority Data
Feb. 18, 2011 (CN) .......................... 2011 1 0040360

(51) Int. Cl.
*B41J 2/195* (2006.01)
*B41J 29/38* (2006.01)
*B41J 2/175* (2006.01)
*G07F 13/02* (2006.01)
*G06Q 20/28* (2012.01)
*G07F 17/26* (2006.01)
*G06Q 20/14* (2012.01)

(52) U.S. Cl.
CPC .............. *B41J 29/38* (2013.01); *B41J 2/17546* (2013.01); *G07F 13/025* (2013.01); *G06Q 20/28* (2013.01); *G07F 17/266* (2013.01); *G06Q 20/145* (2013.01)
USPC ...................................... 347/7; 347/5; 347/86

(58) Field of Classification Search
None
See application file for complete search history.

(56) References Cited

U.S. PATENT DOCUMENTS

| 7,344,214 | B2 | 3/2008 | Chan et al. |
| 7,483,159 | B2 * | 1/2009 | Tokutomo et al. ........... 358/1.15 |
| 2005/0088495 | A1 | 4/2005 | Chan et al. |
| 2008/0106556 | A1 | 5/2008 | Chan et al. |
| 2009/0153602 | A1 | 6/2009 | Brown et al. |

* cited by examiner

*Primary Examiner* — Geoffrey Mruk

(57) ABSTRACT

The present invention relates to a kind of inkjet printer's ink protection method including: the developer generates a rechargeable code in accordance with the print head's nPL, total ink volume $G_0$ and user's identifying information provided by the user; the user purchases ink and its corresponding rechargeable code, inputs the rechargeable code into the printer's control system, and fills ink cartridge in the ink supply system with ink; the printer's control system verifies the effectiveness of the rechargeable code; if the rechargeable code is effective, total ink volume $G_0$ will be added into the ink counter; if not, the rechargeable code is output as ineffective. This ink protection method in the present invention can increase ink utilization rate, reduce the waste of resources and cost, protect the environment, avoid equipment breakdowns caused by using unqualified ink, and improve printer's operating stability. What's more the present ink protection method utilizes printer's software and hardware technologies in prior art, needs no extra equipment, and thus has strong practicability and is cost effective.

6 Claims, 5 Drawing Sheets

User ID: ☐  Print head's nPL: ☐

Ink volume          Rechargeable code

C: ☐                ☐

M: ☐                ☐

Y: ☐                ☐

K: ☐                ☐

(Generate)

Fig.4

| Remnant Ink | Rechargeable code |
|---|---|
| C: ☐ | ☐ ⊕ |
| M: ☐ | ☐ ⊕ |
| Y: ☐ | ☐ ⊕ |
| K: ☐ | ☐ ⊕ |

Fig.5

INKJET PRINTER'S INK PROTECTION METHOD

CROSS REFERENCE TO RELATED APPLICATIONS

This application claims priority under 35 U.S.C §119 from China application number 201110040360.0, filed Feb. 18, 2011, the content of which is incorporated hereinto by reference.

FIELD OF THE INVENTION

The present invention relates to an inkjet printer. More particularly, to an inkjet printer's ink protection method.

BACKGROUND OF THE INVENTION

Inkjet printing technology is a technology in which printing of image or character is realized by controlling print head's nozzles ejecting ink droplet on printing media. The inkjet printer mainly comprises of print head, ink cartridge and control system. Print head ejects ink droplet, ink cartridge stores ink and supplies print head with ink, and the control system stores data of image to be printed, controls print head nozzles' ejection and detects ink level in the ink cartridge. In prior art, some technical measures are taken not only to prevent the user from purchasing and using low cost unqualified inks which may cause equipment breakdowns, but also to guarantee developer's interests on ink sales. At present, intelligent cartridge is commonly used. Take Epson's ink cartridge for example. An intelligent chip is installed in the interior part of the ink cartridge, and such chip can store fixed data, such as name of the manufacturer, date of production, ink type, capacity and cartridge model etc, and operating data that can be resaved, such as date of the first installment and consumed ink in the ink cartridge etc. When data recorded in the chip reaches the pre-determined ink measuring value, printer indicates ink is exhausted and stops printing; under such circumstance, the ink cartridge cannot be refilled, and must be replaced by a new ink cartridge with a intelligent chip to print again. Because data updating of the intelligent chip in the ink cartridge is controlled by the printer, so printer manufacturer designs ink cartridge with intelligent chip that is compatible with the printer mode. In prior art, small capacity of ink cartridge with intelligent chip inside leads to frequent ink cartridge replacement, which is time and effort consuming; in actual use, when printer shows exhaustion of ink, often there is still some ink in the cartridge, which makes the ink remaining in ink cartridge to be discarded; to some extent, it leads to increase cost, waste of resources and not environmentally friendly.

SUMMARY OF THE INVENTION

In allusion to the problems of the present technology in this field, the objective of the present invention is to provide an inkjet printer's ink protection method, which needs no extra equipment, and can improve ink's utilization rate reduce production cost, prevent environment from contamination and realize continuous ink supply, especially suitable for industrial application.

To realize the above mentioned objective, the inkjet printer's ink protection method in the present invention includes the following steps:
  a) The developer generates a rechargeable code in accordance with the volume of the ink droplet ejected from the print head, total ink volume and user's identifying information provided by the user;
  b) The user purchases ink and its corresponding rechargeable code provided by the developer, inputs the rechargeable code into the printer's control system, and adds ink to the ink cartridge of the ink supply system;
  c) The printer's control system verifies the validness of the rechargeable code;
  d) If the rechargeable code is valid, the total ink volume is added to ink counter, and the printer can print properly; if not, the program will report so the rechargeable code is output as expired;
  e) When the print head prints normally, the ink counter subtracts every ink droplet consumed by the print head, meanwhile, the control system estimates whether remnant ink g in the ink counter is zero or not;
  f) When the remnant ink is zero, the printer stops operating and indicates exhaustion of ink.

Moreover, in the aforesaid step e), when the remnant ink is less than X, the printer alarms to indicate that ink should be added, the total ink volume×1%≤X≤the total ink volume×10%.

The user's identifying information includes printer's model, ID of printer's controller board serial, and name of the manufacturer.

In the aforesaid step e), the remnant ink is equal to the total ink volume minus the consumed ink. The consumed ink is the number of image pixel printed multiplied by print head's drop volume.

Compared with the prior art, the inkjet printer's ink protection method in the present invention has the following advantages:
  1. Exhaustion of ink in the ink cartridge does not lead to the replacement of ink cartridge, and what needed is only to buy generic bulk ink in larger container, add ink and purchase rechargeable code, therefore, time spent on frequent replacement of ink cartridge can be saved and ink cartridge with intelligent chip are not needed.
  2. Because the ink counter does not record ink consumed in print head maintenance, and in pressing ink at the beginning and ending of the printing, the ink counter can ensure that every ink droplet purchased by user is used; because of this, ink's utilization rate is greatly improved, waste of resources and cost are reduced, and environmental pollution is avoided.
  3. Prevent user from purchasing other kinds of ink, protect printer from equipment breakdowns caused by using of unqualified ink and guarantee printer's operating stability.
  4. Take advantage of printer's software and hardware technology in prior art, need no extra equipment, good protection tracking of the ink or added hardware cost and easy to be realized.
  5. Guarantee developer's interests on consumable materials.

BRIEF DESCRIPTION OF THE DRAWINGS

Combined with the drawings, other characteristics and advantages of the present invention can be explained more clearly via explanation of principle of the following preferred embodiment.

FIG. 4 is a schematic diagram of the interface operation of the rechargeable code's production by the developer;

FIG. 5 is a schematic diagram of the interface operation of ink's adding by the user.

DETAILED DESCRIPTION OF THE EMBODIMENT

Figure 1:
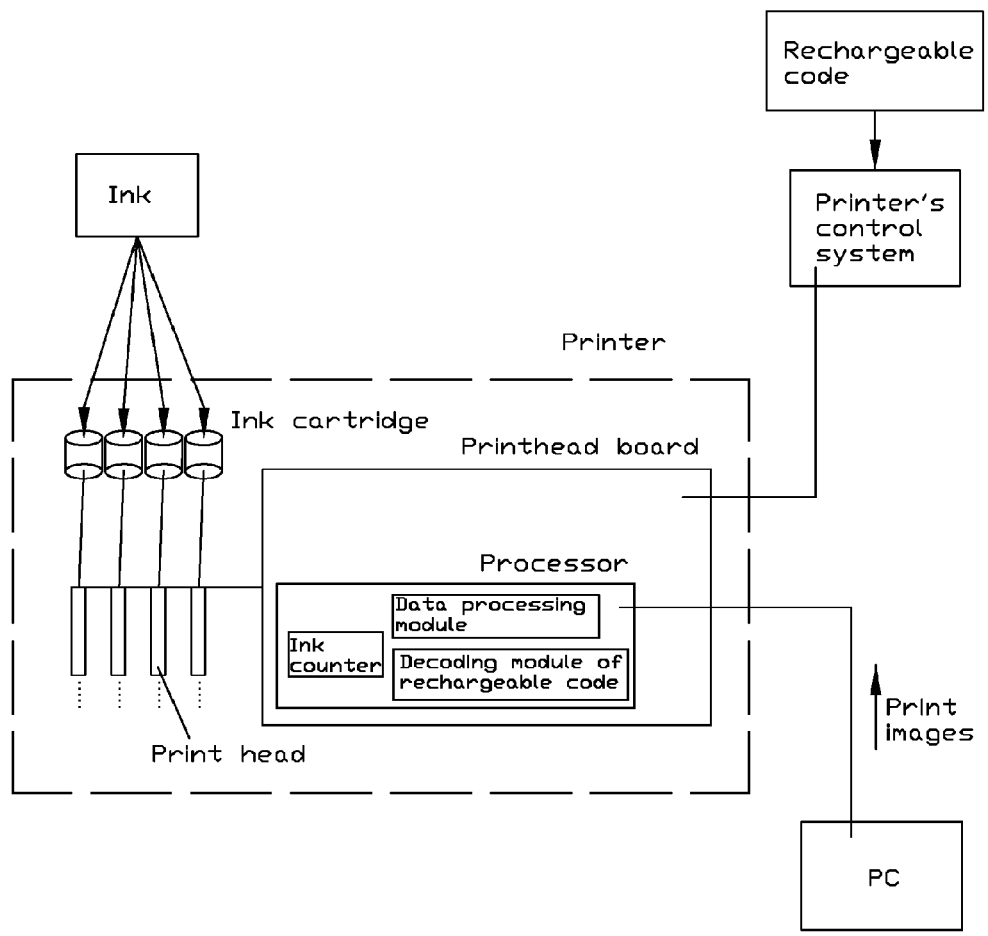
FIG. 1 is a schematic diagram of an embodiment's system structure in the present invention.

As shown in FIG. 1, in order to realize the ink protection method in the present invention, an embodiment of the present invention includes printer, printer's control system and computer; print head's control panel, ink cartridge and print head are installed in the printer; to realize the ink protection method in the present invention, the processor of the print head's control panel comprises a data processing module, an ink counter, and a decoding module of the rechargeable code; the data processing module distributes printing data to each print head, the ink counter records the number of ink droplet printed by the nozzle, and the decoding module verifies the effectiveness of the rechargeable code; the ink cartridge supplies print head with ink, a liquid level sensor is installed in the ink cartridge, which can monitor the ink level in ink cartridge and prompt user to add ink when ink cartridge alarms to show ink's exhaustion, the print head prints image or character. Via the control system's interface, the user can input rechargeable code to the printer's software interface to add ink according to the ink volume in the ink counter; the computer sends data of image need to be printed to print head's control panel.

When image printed by the inkjet printer, the number of ink droplets of each ink color ejected by the print head nozzles in printing of the whole image can be obtained, PL (picoliter) is the intrinsic property of the print head. And the nPL related to the size of ink droplet ejected by print head (n is the natural number greater than zero), the larger the n, the bigger the ink droplet, and small n leads to tiny ink droplet. The amount of ink of a certain color consumed can be obtained by adding the total number of the ink droplet of the color to be printed and the size of the ink droplet ejected from print head, i.e., print head's nPL.

The method of the embodiment in the present invention comprises two parts: ink's purchasing and refilling, and ink's using.

Figure 2:
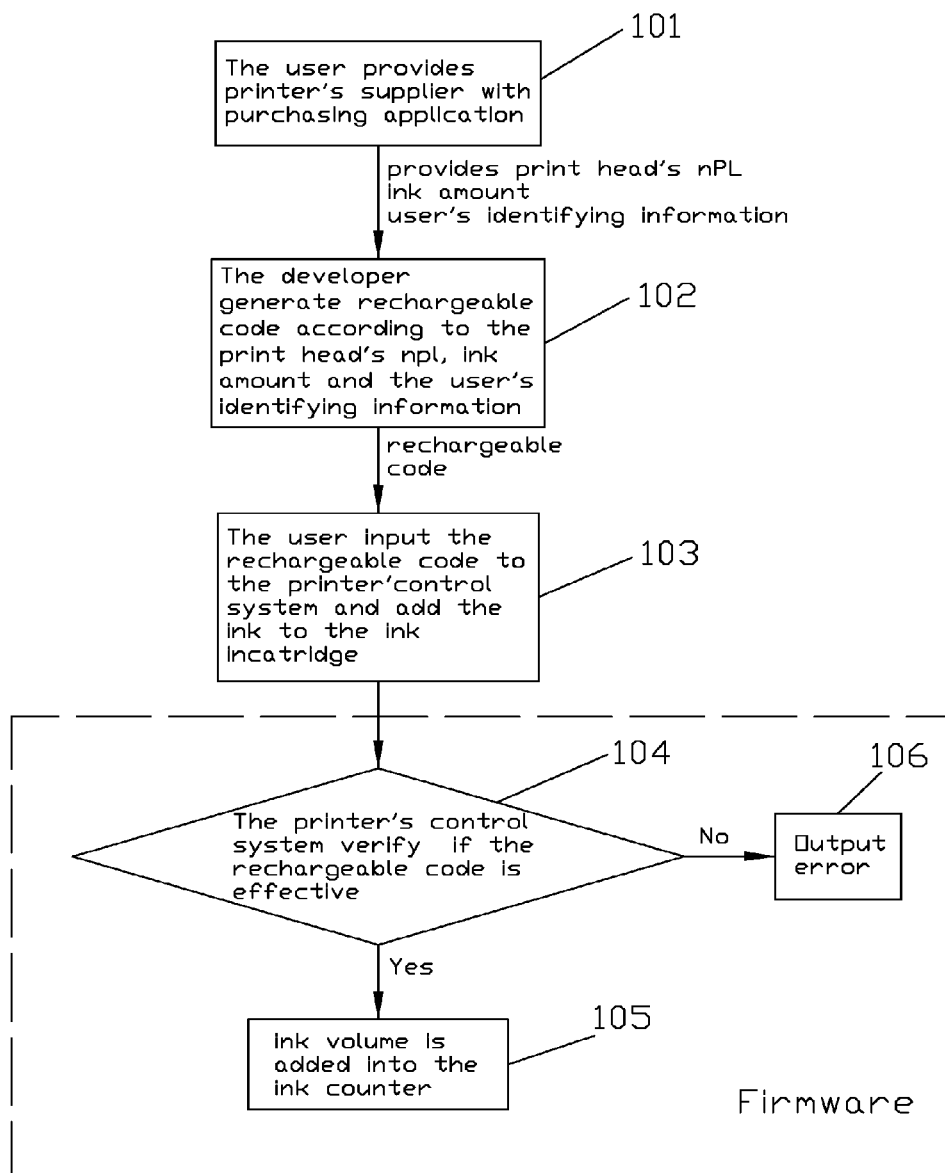
FIG. 2 is a flow chart of purchasing and adding ink in an embodiment of the present invention.
Figure 5:
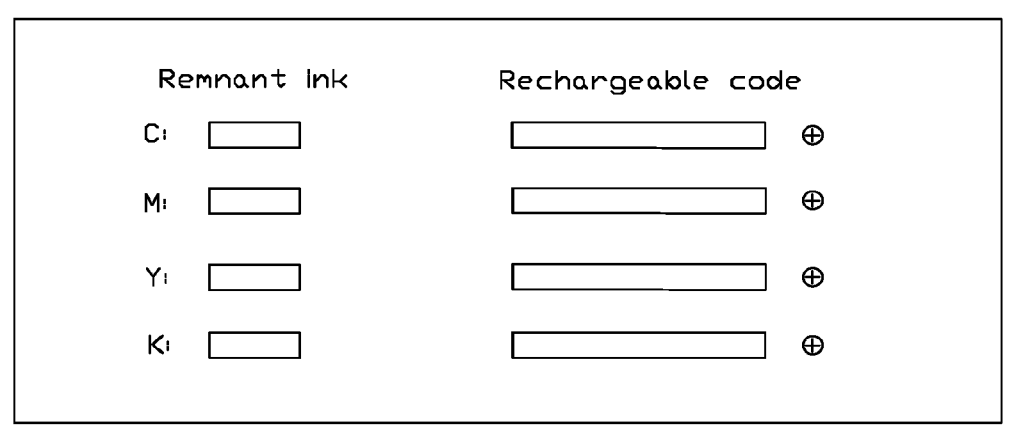

FIG. 2 shows the specific steps by which the user purchases and adds ink in the present invention: In step 101, the user provides printer's supplier with purchasing application, print head's nPL, $G_0$ (amount of each ink should be purchased), and user's identifying information (ID of printer's main board); in step 102, printer's supplier inputs the print head's nPL, $G_0$ of each ink color and user's identifying information into the corresponding frame on the rechargeable code's generating interface, then clicks generating buttons, rechargeable code of the corresponding ink can be generated in its frame as shown in FIG. 4; in step 103, the user purchases all the needed inks and their corresponding rechargeable codes, then adds each ink into its corresponding ink cartridge and inputs rechargeable code into printer's control system; in step 104, click ink adding button in the printer's control system, a dialog box as in FIG. 5 appears, then input the rechargeable code of each ink into the dialog box and click the adding button, the control system verifies the effectiveness of the input rechargeable code; in step 105, if the rechargeable code is effective, ink volume is added into the ink counter, and the remnant ink volume of each color useable is shown on left side of dialog box; otherwise, the control system indicates the ineffectiveness of rechargeable code as shown in step 106.

When rechargeable code is verified as ineffective by the control system, even if the user provides printer's ink supply system with ink, the printer can't be started to print properly, because remnant ink volume in the ink counter is zero, and the control system just regards ink as exhausted. When the rechargeable code is effective, the control system adds purchased ink volume into the ink counter. If user does not add ink into ink cartridge of the ink supply system, the control system alarms to indicate shortage of ink, and only there is ink in ink cartridge and the remnant ink in ink counter is not zero can printer's print head print properly.

Figure 3:
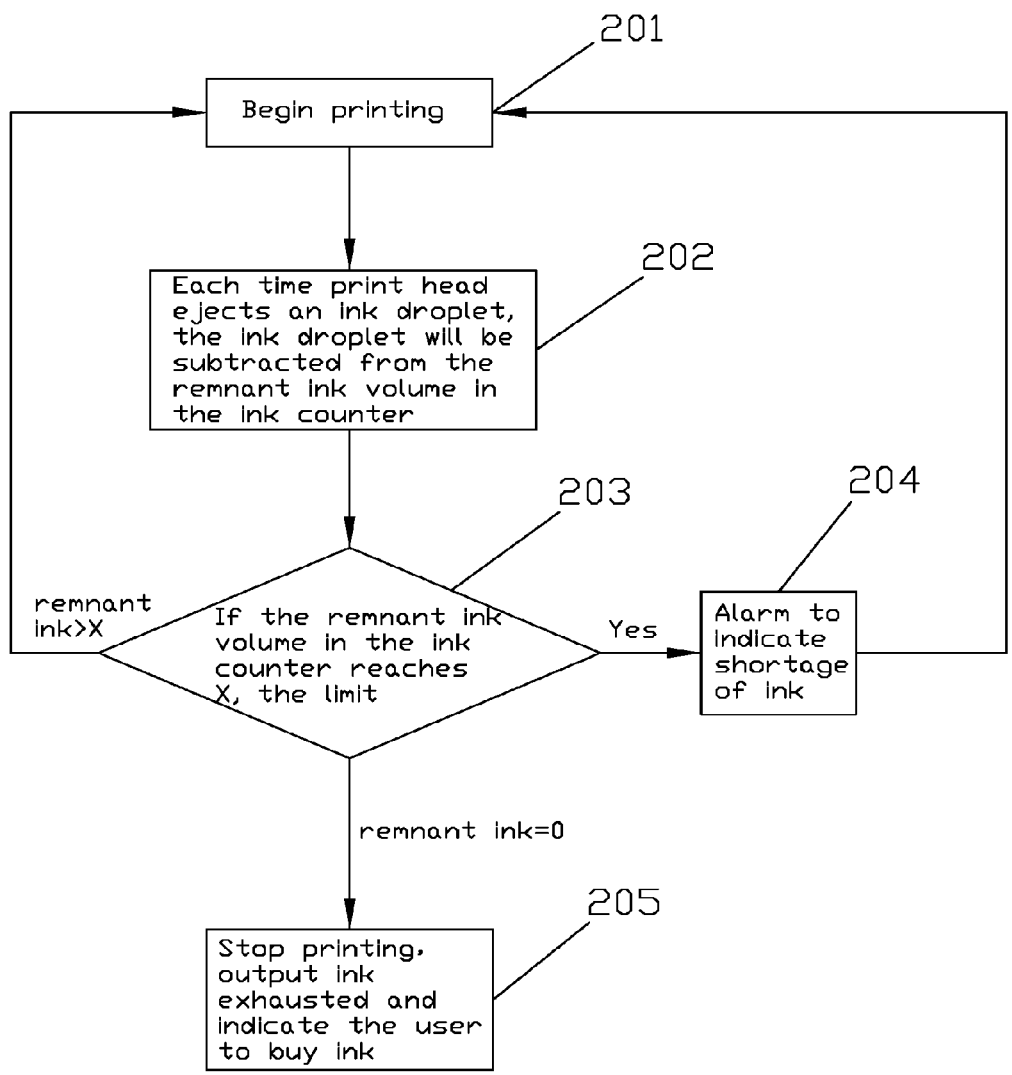
FIG. 3 is a flow chart of ink usage in an embodiment of the present invention.

FIG. 3 is specific steps of user's using of ink in the present invention:

In step 201, when total ink volume in both ink cartridge and ink counter is not zero, the print head can print properly, and in the course of printing, ink counter in the control system begins to record each ink droplet consumed in the process of printing; in step 202, each time print head ejects an ink droplet, the ink droplet will be subtracted from the remnant ink volume in the ink counter; meanwhile, in step 203, the control system estimates if the remnant ink volume in ink counter reaches X, the limit; in step 204, if remnant ink volume reaches X, the printer gives an alarm to indicate shortage of ink, and continues to print; in step 205, when remnant ink volume is zero, printer stops printing, shows exhaustion of ink, and reminds the user to purchase ink volume and rechargeable code.

In step 102, the developer can adopt any encryption algorithm to generate rechargeable code.

In step 102, when generating rechargeable code, the developer can impose more restrictions on ID of printer's controller board, printer's model, name of the manufacturer and date of production etc.

In step 203, the total ink volume minus the consumed ink volume is the remnant ink volume, and consumed ink equals to points of printed image multiplied by print head's nPL. As to $G_0 \times 1\% \leq X \leq G_0 \times 10\%$, user can set the value of X in accordance with practical situation, usually, X is 10% of the total ink volume $G_0$.

In step 203, consumed ink does not include the ink used before printing, after printing, and in cleaning the nozzles, therefore, rechargeable code purchased by user can guarantee that every ink droplet will be consumed completely, which can greatly improve ink's utilization rate, protect user's economic interests, reduce the waste of resources and cost, and protect environment.

In step 205, when ink is exhausted, if printing need to be continued, the user needs to purchase rechargeable code and its corresponding volume of ink again, and then go back to step 101.

When ink is exhausted, the user only needs to purchase a rechargeable code and its corresponding ink from the printer provider and add the purchased ink in the original ink cartridge, which needn't to be replaced; such action can save time consumed by frequent replacement of ink cartridge, cut down cost for manufacturing ink cartridge and intelligent chip, and reduce production of e-waste. The user can purchase different volumes of ink and its corresponding rechargeable code in accordance with his/her own need, and purchases rechargeable code and ink when ink is used up or is going to be used up, which realizes the continuous ink supply.

When the ink ejected by print head reaches the limit set by rechargeable code, even if the user adds ink the into ink cartridge, the printer still shows exhaustion of ink and cannot print which can prevent user from purchasing other kinds of ink, therefore, equipment breakdowns caused by using of unqualified ink can be avoided, and operating stability of printer, interests of developer's consumable materials can be guaranteed.

The ink protection method in the present invention takes advantages of printer's software and hardware technologies in prior art, needs no extra equipment, and has strong practical, industrial application and is cost effective.

What is claimed is:

1. An inkjet printer's ink protection method, including the following steps:
   1) The developer generates the rechargeable code in accordance with the volume of the ink droplet ejected from the print head, total ink volume and user's identifying information provided by the user;
   2) The user purchases ink and its corresponding rechargeable code, inputs the rechargeable code into printer's control system, and adds ink in the ink cartridge of the ink supply system;
   3) Printer's control system verifies effectiveness of the rechargeable code;
   4) If it is effective, the control system adds ink volume to the ink counter, and the printer can print properly; if not, the rechargeable code is output as ineffective.

2. The inkjet printer's ink protection method according to claim 1, wherein, also includes the following steps:
   1) When print head prints normally, ink counter subtracts ink consumed by print head;
   2) The control system estimates whether remnant ink in the ink counter is zero or not;
   3) When remnant ink is zero, the printer stops printing and shows the exhaustion of ink.

3. The inkjet printer's ink protection method according to claim 2, wherein, in step 2), when the remnant ink is less than X, the printer alarms to show ink should be added, and the total ink volume×1%≤X≤the total ink volume×10%.

4. The inkjet printer's ink protection method according to claim 2, wherein, the remnant ink g in step 2) is equal to the total ink volume minus the consumed ink.

5. The inkjet printer's ink protection method according to claim 4, wherein, the consumed ink equals to pixel points of images to be printed multiplied by the volume of the ink droplet ejected from the print head.

6. The inkjet printer's ink protection method according to claim 1, wherein, the user's identifying information includes printer's model, ID of main board, and name of the manufacturer.

* * * * *